Jan. 30, 1968   E. T. STROM   3,366,257
NON-TELESCOPING DRIVE FOR BARGES
Filed Feb. 3, 1966   2 Sheets-Sheet 1
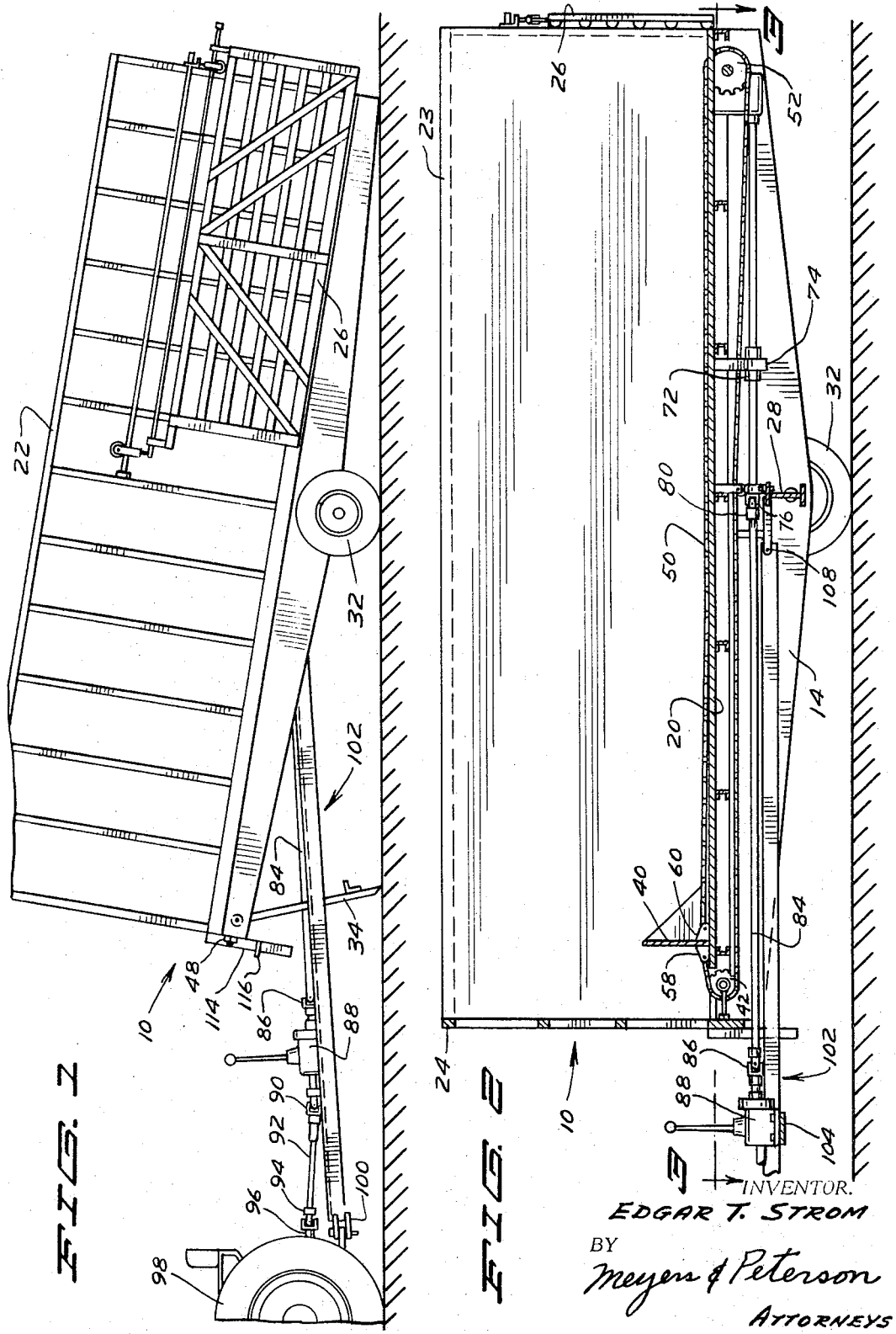
INVENTOR.
EDGAR T. STROM
BY
Meyen & Peterson
ATTORNEYS

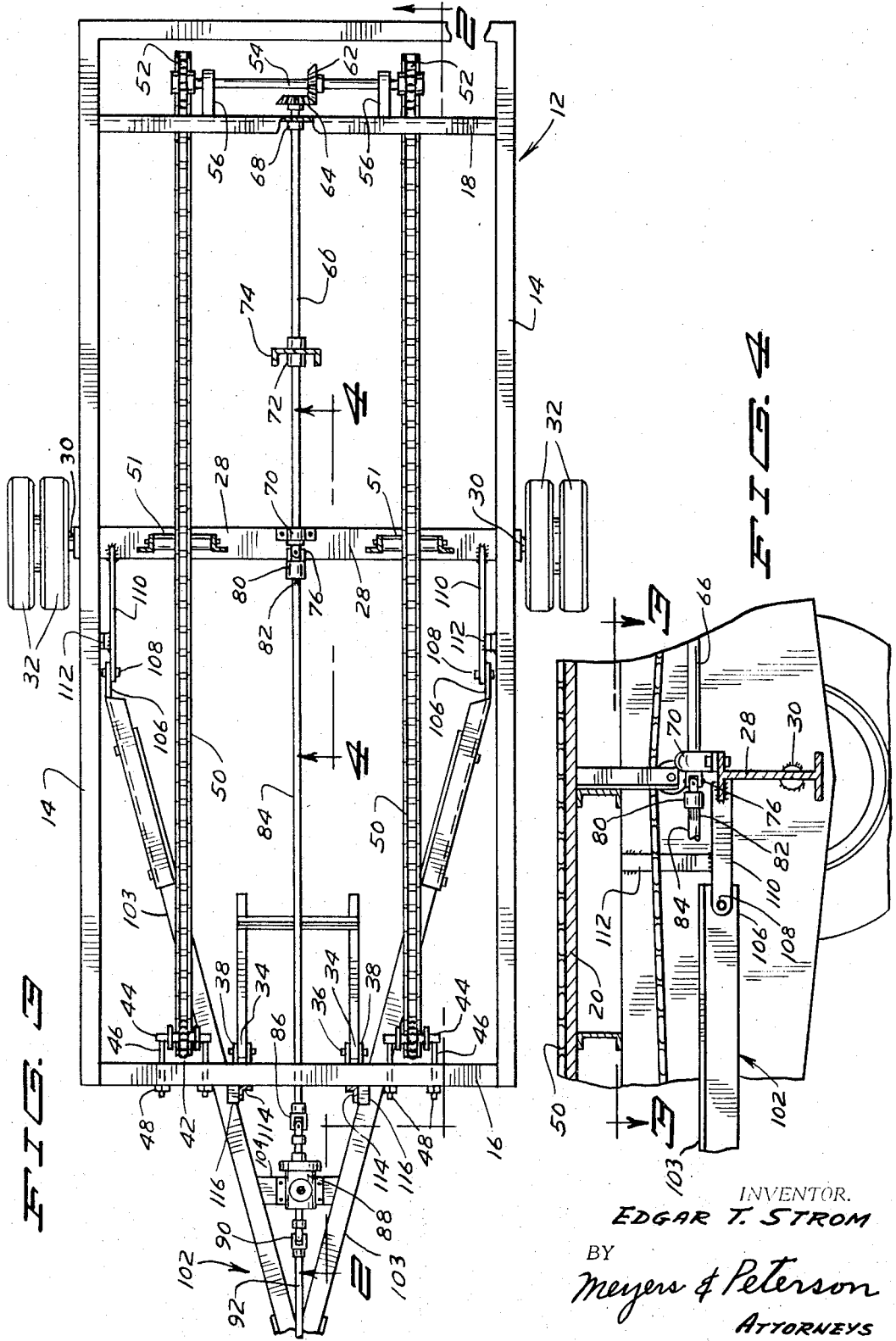

United States Patent Office 3,366,257
Patented Jan. 30, 1968

3,366,257
NON-TELESCOPING DRIVE FOR BARGES
Edgar T. Strom, Beulah, N. Dak. 58523
Filed Feb. 3, 1966, Ser. No. 524,910
7 Claims. (Cl. 214—505)

ABSTRACT OF THE DISCLOSURE

A barge has a body that is tiltable about a transverse axis provided by a pair of laterally spaced wheels. A pusher is slidable longitudinally of the body, more specifically, along the floor thereof either forwardly or rearwardly by means of a pair of endless chains entrained about sprockets located at each end of the body. The rearwardly located sprockets are driven by a first shaft that extends forwardly to a locus near the transverse axis and a second shaft extends forwardly from the first shaft, a universal joint connecting the two shafts together. There is no tendency to telescope when the body is tilted by virtue of the location of the universal joint and its connection to the shafts close to the axis about which the body tilts.

---

This invention relates generally to barges for transporting bulky loads such as hay, straw and the like, and pertains more particularly to a drive mechanism for effecting the unloading of the material carried on the barge.

Barges of the envisaged type are old and well known. It is conventional to utilize a pusher member that is moved rearwardly to cause the unloading to occur. Since barges of the character with which the present invention is concerned are pulled by a tractor and the driving power is derived from the power take-off of such a towing vehicle, various problems have arisen in transmitting the power from such take-off to the pusher member.

For instance, in my U.S. Patent No. 2,617,683, a spline of considerable length is shown. Not only is such a spline quite costly, but certain problems arise due to the appreciable telescopic action that takes place. In this regard, it will be recognized that various conditions can arise which would cause misalignment to take place with a concomitant binding of the relatively movable parts constituting such a spline. Such misalignment is most apt to occur when the unloading is being effected on uneven ground. More specifically, the tractor may be oriented in one direction with respect to a true horizontal, and the barge might reside on ground that is angularly disposed with respect to the ground on which the tractor is resting. The ensuing torsional forces that are imposed under these conditions result in the aforementioned binding action.

Other arrangements have been proposed. One such arrangement has made use of cables. The difficulty encountered with the use of cables is that considerable slack is experienced, and various idlers have been resorted to to take up such slack.

Accordingly, an object of the present invention is to provide a driving mechanism that avoids the use of a lengthy telescoping spline and also which eliminates the need for troublesome cables. More specifically, the present invention employs a shaft arrangement that extends from a transmission located near the front of the barge and which terminates at the rear of the barge, there being a universal joint interposed in the shafting that allows a pivotal action to occur when the barge is being tilted in preparation for unloading. The universal joint is located at a vantage point which for all intents and purposes eliminates the need for a spline. In theory, a spline of any type can be eliminated, but as a practical matter, the reliance upon a very short spline allows the tilting of the barge to occur without the occurrence of the problems normally experienced with a spline of considerable length. This will become apparent as the detailed description progresses.

Another object of the invention is to provide a non-telescoping drive for the pushers of hay barges which will not require any amount of attention as far as maintenance is concerned, and which will be completely reliable for long periods of use.

A further object of the invention is to provide a driving mechanism of the foregoing character that will not interfere with the return of the barge from its tilted or dumping position to its horizontal or load transporting position.

These and other objects and advantages of my invention will more fully appear from the following description, made in connection with the accompanying drawings, wherein like reference characters refer to the same or similar parts throughout the several views and in which:

FIGURE 1 is a side elevational view of a barge exemplifying my invention, the barge there depicted being shown in a tilted position which it assumes when it is to be unloaded;

FIGURE 2 is a sectional view taken generally in the direction of line 2—2 of FIGURE 3 for the purpose of showing the drive mechanism in its entirety and also in relationship with the pusher;

FIGURE 3 is a sectional view taken in the direction of line 3—3 of FIGURE 2, the view being just below the flooring so as to present a plan view of the drive mechanism, and FIGURE 4 is a sectional view taken in the direction of line 4—4 of FIGURE 3 for the purpose of showing the universal joint on a larger scale than that on which it appears in FIGURE 2.

Referring now in detail to the drawings, a barge exemplifying my invention has been designated in its entirety by the reference numeral 10. While the barge 10 is susceptible to various modifications, basically it includes a body which may include a rectangular main frame 12 having underlying side trusses or beams 14 extending longitudinally thereof, there being one such truss or beam 14 at each side of the frame. Still further, the frame 12 includes a front transverse member 16, and a rear transverse member 18. Thus, it can be seen from FIGURE 3 that the frame 12 is rectangular and is rendered so by reason of the members 14, 16 and 18.

Overlying the rectangular main frame 12 is a floor labeled 20. The floor appears only in FIGURE 2, but it will be appreciated that it extends to either side of the side trusses or beams 14 in order to provide a relatively wide surface upon which the load can be placed. As already indicated, the load is quite bulky and will usually constitute hay, straw or similar material. Extending upwardly at each side of the floor 20 are walls 22 and 23. Inasmuch as the barge itself is susceptible to change, the particular construction of the side walls 22 and 23 can be selected to suit the particular circumstances. As shown, each side wall 22, 23 is composed of sheet material plus vertical studs for reinforcing purposes. At the front of the barge is a grille 24, the grille 24 constituting the third side. The fourth side, this being at the rear of the barge, has an end gate 26 normally closing the opening between the side walls 22, 23. The end gate is swingable from the position shown at the rear or right in FIGURE 2 to that in which it appears in FIGURE 1. It will be understood that the end gate 26 is swung to the side of the wall 22 prior to tilting the barge preparatory to unloading the material being present on the floor 20.

At this time, attention is directed to a transverse beam 28 that extends between the side trusses or beams 14. In combination with the beams 14, the transverse beam 28 provides support for a pair of oppositely projecting axles 30 on which are mounted dual wheels 32. It will be understood that the floor 20 projects or overhangs the wheels 32 at each side, thereby presenting the broad supporting surface that has been previously alluded to.

For the purpose of rocking the barge 10 about a transverse axis provided by the axles 30, a pair of tilt legs 34 are pivotally attached to a pair of pins 36, as can be discerned from an inspection of FIGURE 3. These pins 36 are supported on mounting ears 38 which are welded or otherwise fixedly secured to the front transverse member 16. Thus, when the legs 34 are lowered so as to be engageable with the ground, rearward movement of the barge 10 will cause the forward end of the barge to be raised with the consequence that the rear end of the barge will be lowered. This action is the same that takes place with the structure described in my aforesaid patent.

From FIGURE 2, it will be perceived that the pusher has been indicated by the reference numeral 40. The pusher 40 is constrained for forward and rearward movement. Thus, from the position in which it is pictured in FIGURE 2, it is intended that the pusher be moved rearwardly to discharge the load onto the ground. In other words, the pusher 40 moves along the floor 20 in order to effect the unloading of the material carried by the barge 10. In order to move the pusher 40 in a fore and aft direction, a pair of forward sprockets 42 are rotatably mounted on a pair of shafts 44. Through the agency of adjusting bolts 46, there being two such bolts 46 attached to the opposite ends of the supporting shafts 44, the sprockets 42 can be moved forwardly and rearwardly for a purpose presently to be described. Nuts 48 on the projecting end of the bolts 46, the bolts extending through the front transverse member 16, allow the adjustment to be made.

At this time, it is desirable to make reference to a pair of cables or chains 50. It should be explained, however, that a single such cable or chain could be used. Actually, since chains have been illustrated, further reference will be made to the chains even though cables could be tautly stretched about pulleys or sheaves instead of the sprockets 42.

Thus, the chains 50 are entrained about the forwardly located sprockets 42 and extend rearwardly to a pair of similar sprockets 52. There is a connecting shaft 54, as can be readily seen from FIGURE 3, extending between the two sprockets 52, the shaft 54 being journaled or rotatably supported on a pair of arms 56 extending rearwardly from the rear transverse member 18. From FIGURE 2, it will be noted that the opposite ends of the chains 50 are connected to the pusher 40 as indicated at 58 and 60. In other words, the chain 50, there being two actually shown, may be considered to be of the endless variety, the chains 50 completely encircling the sprockets 42 and 52.

In order to rotate the shaft 54 and thus the sprockets 52 to impart movement to the chains 50, a pair of bevel gears 62, 64 are utilized. More specifically, the gear 52 is fixedly mounted on the shaft 54 and the bevel gear 64 is fixedly mounted at the rear end of a forwardly extending shaft 36 which is journaled adjacent its rear end in a bearing 68 supported on the rear transverse member 18.

The shaft 66 is journaled at its forward end in a bearing 70. If desired, an intermediate bearing 72 can be employed and in the illustrated situation, the bearing 72 is carried by a downwardly extending hanger 74 which is of a channel-shaped configuration, as can be seen in FIGURE 3.

It is important to observe that the bearing 70 is mounted directly on the upper surface of the transverse beam 28. The axles 30 are directly associated with the beam 28, and for all intents and purposes, the beam 28 rocks about the axles 30 when the barge 10 is tilted from its horizontal position to its dumping or discharging position.

The crux of my invention centers about the employment of a universal joint 76 which is shown as being just forward of the bearing 70. Whereas the universal joint has been identified by the reference numeral 76, it will be appreciated that there is an internally splined cup 80 forming an integral part of the universal joint. In slidable engagement with the cup 80 are externally disposed splines 82 on a second forwardly extending shaft 84. More will be said presently concerning the role played by the shaft 84. Before discussing the shaft 84 in further detail, the construction of the universal joint 76 should be dealt with in greater detail. It will be recognized that this joint 76 can constitute various constructions. It has been shown in a very simple way, but it will be appreciated by those familiar with the various types of universal joints that the joint may constitute a Weiss universal joint which is quite widely used. Briefly, a Weiss universal joint includes a number of steel balls inserted in intersecting races, cut in the two joint members for the purpose of transmitting motion and yet permitting axial movement of the connected shafts to take place. Various types of slip joints can be employed also, one such type of slip joint really being present in the internally splined cup 80 and its extensible and contractable engagement with respect to the splined end 82 on the shaft 84. As already generally indicated, it is possible to eliminate completely any relative or telescoping movement with the present invention, but as a practical matter, it is easier to allow for some small amount of telescoping movement to take place, and provision for this limited amount of telescoping movement is made by the universal joint 76 coupled with the splined arrangement that has been described.

Continuing with the description of the shaft 84, it will be seen from FIGURES 2 and 3 that this shaft extends forwardly to the front of the barge and connects with a second universal joint 86. The universal joint 86 in turn is connected to a transmission 88. Still another or third additional universal joint 90 is disposed forwardly of the transmission 88 and connects with a shaft 92, the shaft 92 in turn extending to still another or fourth universal joint 94 connected directly to the power take-off 96 of a conventional tractor 98.

The tractor 98 is also equipped with a hitch 100 of conventional construction. It is to this hitch 100 that the forward end of an A-frame 102 is coupled. It will be understood that the A-frame 102 acts as a drawbar, being composed of diverging members 103 and a bridging member or plate 104 on which the transmission 88 is mounted. In other words, the A configuration is formed by the members 103 and the member 104 as can be easily seen from FIGURE 3. The ends of the members 103 are identified by the reference numeral 106 and these ends 106 are attached to pull pins 108. The pull pins are carried at the forward ends of a pair of pull arms 110, the rear ends of these pull arms 110 being welded or otherwise fixedly secured with respect to the transverse beam 110; there is a vertical brace 112 also associated with each pull arm 110, the purpose of the two braces 112 being to add further reinforcement for the pull pins 108. The function played by the pull pins 108 is better reserved for discussion during a typical operational sequence.

While not important to a practicing of the present invention, it will be noted that a pair of auxiliary legs 114 extend downwardly from the front transverse member 16, having a foot pad 116 thereon in each instance. These foot pads 116 bear on intermediate portions of the angularly oriented members 103 of the A-frame 102. Ordinarily, means for latching the legs 114 in a fixed relationship with the A-frame 102 would be utilized, but for drafting simplicity the latching arrangement has been omitted. For instance, the same type of latching mechanism as shown in my previously-mentioned patent could be employed if desired; of course, other constructions also are possible.

Having presented the foregoing information, an operational sequence will now be given. Assuming the barge 10 is in the position illustrated in FIGURE 2, the end gate 26 would first be shifted from the position there shown to a side position which is depicted in FIGURE 1. Next, the tilt legs 34 would be lowered so that their bottom ends engage the ground as can also be seen from FIGURE 1. It is when the tractor 98 is backed up that the lower ends of the legs 34 will literally dig into the ground and will not move rearwardly. This causes the forward end of the barge 10 to be raised with the consequence that the rear end will be lowered. The tilting or rocking occurs about the axles 30.

During this happening, the transverse beam 28 will rotate angularly in a clockwise direction as viewed in FIGURE 4. This causes the bearing 70 mounted on its upper surface to also move through a small angle, as well as the universal joint 76. Still further, since the transmission 88 is mounted on the bridging plate 104 of the A-frame 102, the forward shaft 84 moves somewhat rearwardly as does the rear shaft 66. Owing to the mounting of the transmission 88 on the A-frame itself, there is no relative movement of the transmission 88 with respect to the A-frame 102.

Continuing with the above portion of the operating sequence, the A-frame 102, being connected to the main frame 12, as well as the transverse beam 28 through the instrumentality of the pull pins 108, moves rearwardly also. The function of the pull pins 108 is to pull the barge back to its horizontal position after the dumping or unloading has been completed. However, the relative movement of the pull pins 108 with respect to the universal joint 76 should be as minimal as practical. It is at this time that the desirability of utilizing the splines 82 and the cup 80 should be apparent. In other words, if there were strict coincident of movement as between the pull pins 108 and the universal joint 76, then there would be no telescoping action taking place.

Not only does the universal joint 76 move through an arcuate path approximating the arcuate path traversed by the pull pins 108, but it will be discerned from FIGURE 4 that the universal joint 76 is not spaced very far from the axles 30, one such axle appearing in FIGURE 4. Thus, by reason of the universal joint 76 being disposed near the pivotal or tilting axis about which the barge 10 rocks, there is very little telescoping action that transpires, whatever amount occurring being permissible by the splines 80, 82. This is in complete contrast with the large amount of telescoping action that occurs in my aforesaid patent.

Once the barge has been tilted into the position illustrated in FIGURE 1, the transmission 88 can be utilized for transmitting power rearwardly from the power take-off 96 of the tractor 98, this causing the shafts 84 and 66 to rotate in a direction to cause the shaft 54 to rotate and turn the rear sprockets 52 in a direction to pull the pusher 40 rearwardly. As its name denotes, the pusher 40 acts against the hay or similar material being carried on the floor 20 and shoves it rearwardly via the opening existing between the side walls 22, 23. When the unloading action has been completed, then the shafts 84 and 66 are rotated in a reverse direction to move the pusher 40 forwardly or back to the position in which it appears in FIGURE 2.

The return of the barge 10 to its horizontal position is brought about by moving the tractor 98 forwardly. It is at this time that the pull pins 108 act to level the barge 10, doing so by virtue of the moment arm existing between the pins 108 and the axle 30. As with the tilting of the barge 10 to the position shown in FIGURE 1, the reverse movement thereof also produces very little telescoping action adjacent the universal joint 76.

In summary, the present invention is concerned with the disposition of a universal joint, more specifically the joint 76, in a strategic or optimum position whereby very little telescoping action takes place. Consequently, the misalignment problems heretofore present in splined arrangements of considerable length are for all intents and purposes eliminated. Also, it will be recognized that the goal is achieved without resort to rather complicated cable drives, such drives requiring special elements for taking up any slack that would otherwise result when the barge is tilted from one position to the other.

It will, of course, be understood that various changes may be made in the form, details, arrangements and proportions of the parts without departing from the scope of my invention as set forth in the appended claims.

I claim:

1. A barge comprising a body having forward and rear ends, laterally spaced wheels disposed on a transverse axis intermediate said ends for supporting said body for pivotal movement about said transverse axis, means for tilting said body about said transverse axis to lower said rear end preparatory to unloading the contents of said barge, a pusher member, elongated flexible means connected to said pusher member for moving said pusher member forwardly and rearwardly, first means adjacent the forward end of said body about which said flexible means is entrained, second means adjacent the rear end of said body about which said flexible means is entrained, a first shaft drivingly connected to said second means for moving said pusher member either forwardly or rearwardly depending upon the direction of rotation of said shaft, said shaft extending forwardly to a locus near said transverse axis, a second shaft extending forwardly from a proximal relationship with the forward end of said first shaft for connection to a power unit when disposed forwardly of said barge, and universal joint means connecting the rear end of said second shaft to the forward end of said first shaft, whereby when the body is tilted substantially non-telescoping rotative power is transmitted from said second shaft to said first shaft to cause movement of said pusher member.

2. A barge in accordance with claim 1 in which a cross beam extends between said wheels and said joint means are supported on said cross beam.

3. A barge in accordance with claim 2 in which the upper surface of said cross beam is above said transverse axis, and a bearing mounted on said surface for journaling the forward end of said first shaft so as to support said joint means.

4. A barge in accordance with claim 3 and which includes an elongated drawbar pivotally connected at its rear end to opposite sides of said body at pivot points disposed forwardly with respect to said transverse axis.

5. A barge in accordance with claim 4 including transmission means on said A-frame, said transmission means being connected to the forward end of said second shaft.

6. A barge in accordance with claim 5 including a third shaft extending forwardly from said transmission means for connection to the power take-off of a tractor when said tractor constitutes a power unit.

7. A barge in accordance with claim 6 including a hitch at the forward end of said A-frame for connection to said tractor, said tilting means further including a leg member pivotally connected at its upper end to the underside of the forward end of said body and having a length such that said leg member raises the forward end of said body to cause lowering of said rear end of said body when the lower end of said leg engages the ground during rearward travel of the tractor.

References Cited

UNITED STATES PATENTS

| | | | |
|---|---|---|---|
| 2,606,677 | 8/1952 | Snedeger. | |
| 3,110,406 | 11/1963 | Roth | 214—510 |
| 3,128,894 | 4/1964 | Nelson | 214—509 |

GERALD M. FORLENZA, *Primary Examiner.*

ALBERT J. MAKAY, *Examiner.*